United States Patent
Song et al.

(10) Patent No.: US 12,449,705 B2
(45) Date of Patent: Oct. 21, 2025

(54) VIEWING ANGLE CONTROL FILM AND DISPLAY DEVICE COMPRISING THE SAME

(71) Applicant: LG Display Co., Ltd., Seoul (KR)

(72) Inventors: Sunbok Song, Paju-si (KR); Taehyung Kim, Paju-si (KR); Kyuoh Kwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 461 days.

(21) Appl. No.: 17/976,611

(22) Filed: Oct. 28, 2022

(65) Prior Publication Data

US 2023/0205029 A1    Jun. 29, 2023

(30) Foreign Application Priority Data

Dec. 24, 2021  (KR) .................. 10-2021-0187284

(51) Int. Cl.
  *G02F 1/137* (2006.01)
  *G02F 1/155* (2006.01)
  *G02F 1/163* (2006.01)

(52) U.S. Cl.
  CPC .............. *G02F 1/137* (2013.01); *G02F 1/155* (2013.01); *G02F 1/163* (2013.01)

(58) Field of Classification Search
  CPC ........... G02F 1/137; G02F 1/155; G02F 1/163
  USPC ...................................................... 359/296
  See application file for complete search history.

(56) References Cited

FOREIGN PATENT DOCUMENTS

| CN | 110047444 A | * | 7/2019 |
|---|---|---|---|
| KR | 10-2007-0000551 A | | 1/2007 |
| KR | 10-2021-0019587 A | | 2/2021 |
| KR | 10-2021-0136836 A | | 11/2021 |
| KR | 20210136836 A | * | 11/2021 |
| KR | 10-2021-0147612 A | | 12/2021 |
| KR | 20210147612 A | * | 12/2021 |

OTHER PUBLICATIONS

Zhang et al., "Backflow Effect Enabling Fast Response and Low Driving Voltage of Electrophoretic E-ink Dispersion by Liquid Crystal Additives", Scientific Reports, https://doi.org/10.1038/s41598-019-50382-y, Sep. 27, 2019, 8 pages.

* cited by examiner

*Primary Examiner* — Michael H Caley
(74) *Attorney, Agent, or Firm* — Birch, Stewart, Kolasch & Birch, LLP (57) ABSTRACT

A viewing angle control film and a display device including the viewing angle control film are discussed. The viewing angle control film can include a first electrode, a second electrode spaced apart from and facing the first electrode, a light conversion layer disposed between the first electrode and the second electrode, and a control unit configured to adjust a viewing angle of the light conversion layer by adjusting a voltage applied between the first electrode and the second electrode. The light conversion layer can include a plurality of partition walls disposed to be spaced apart between the first electrode and the second electrode, a plurality of containing portions disposed between partition walls and disposed with predetermined gaps along the first electrode, and dispersion liquid, light blocking particles and liquid crystals disposed in each of the plurality of containing portions.

14 Claims, 8 Drawing Sheets

| MODE | Duty Cycle (%) | Voltage |
|---|---|---|
| 1 | 50 | $|V1| = |V2|$ |
| 2 | 50~100 | $|V1| = |V2|$ |
| 3 | 75~100 | $|V1| = |V2|$ |
| 4 | 75~100 | $|V1| = |V2|$ |

| MODE | Duty Cycle (%) | Voltage |
|---|---|---|
| 1 | 50 | \|V1\| = \|V2\| |
| 2 | 50 | \|V1\| > \|V2\| |
| 3 | 50 | \|V1\| > \|V2\| |
| 4 | 50 | \|V1\| > \|V2\| |

VIEWING ANGLE CONTROL FILM AND DISPLAY DEVICE COMPRISING THE SAME

CROSS REFERENCE TO RELATED APPLICATION

The present application claims priority to Korean Patent Application No. 10-2021-0187284, filed on Dec. 24, 2021 in the Republic of Korea, the entire contents of which are hereby expressly incorporated by reference into the present application.

BACKGROUND OF THE DISCLOSURE

Field

The present disclosure relates to a viewing angle control film and a display device comprising the same.

Discussion of the Related Art

A demand on display devices for displaying an image is increasing across various types of devices, as the information society develops further. Against such backdrop, various display devices such as a liquid crystal display device (LCD), a light emitting device, an organic light emitting display device (OLED), a micro light emitting device, a quantum dot display device and the like are being used.

In general, such a display device is developed to have a wide viewing angle so that a user can view an image in various angular directions. However, if the viewing angle of the display device is wide, there can be a case where a wide viewing angle adversely affects the characteristics of the product. Therefore, a display device providing a narrow viewing angle is also needed.

For example, in case of an automated teller machine (ATM) of a bank, it is more preferable that the viewing angle of the display device is narrow because it is desirable to prevent others around the ATM from recognizing the personal information when the user inputs personal information. In addition, in case of a vehicle navigation system, when the viewing angle of the display device is wide, light can be reflected on a windshield of the vehicle during night driving, which can adversely affect the driver's safe driving. In addition, in case of a computer or a mobile phone, having a wide viewing angle can run counter to a demand of a user since the user may not want private information to be disclosed.

Therefore, there are robust studies regarding a viewing angle control film capable of adjusting a viewing angle to be adapted to situations.

The viewing angle control film controls a light traveling path, blocks light heading for a certain direction, and transmits light heading for another certain direction, thereby controlling a viewing angle of a user.

In the meantime, a user can turn on or off the viewing angle control of the viewing angle control film, by blocking light heading for a certain direction or transmitting light heading for a certain direction through dispersion and aggregation of light blocking particles according to an electric signal.

In this case, if the viewing angle control film is exposed in a low-temperature environment, a limitation of a deteriorated driving performance can occur as the viscosity of light blocking particles increases.

In addition, if driving the viewing angle control film for a long time in a share mode that implements to emit light over a predetermined angle range, a light leakage defect can occur in a private mode that implements to emit light in less than a predetermined angle range due to agglomeration of the light blocking particles.

SUMMARY OF THE DISCLOSURE

Some embodiments of the present disclosure aims to address the limitation described above and to provide a viewing angle control film having an improved driving performance and reliability in a low-temperature environment and a display device including the same.

One embodiment of the present disclosure provides a viewing angle control film including: a first electrode; a second electrode spaced apart from and facing the first electrode; a light conversion layer disposed between the first electrode and the second electrode; and a control unit configured to adjust a viewing angle of the light conversion layer by adjusting a voltage applied between the first electrode and the second electrode, and the light conversion layer comprises: a plurality of partition walls disposed to be spaced apart between the first electrode and the second electrode; a plurality of containing portions formed between partition walls and disposed with predetermined gaps along the first electrode; and dispersion liquid, light blocking particles and liquid crystals disposed in each of the plurality of containing portions, and the control unit is configured to apply a pulse voltage that swings between a positive signed first voltage and a second voltage having the same magnitude as a magnitude of the first voltage and a polarity opposite to a polarity of the first voltage, and adjusts a duty cycle, which is a proportion occupied by an interval of the first voltage, in each drive mode.

The control unit is configured to adjust the duty cycle to 50% in a mode 1.

The control unit controls the duty cycle to gradually increase from 50% to a value less than 100% in a mode 2.

The control unit is configured to intermittently apply the pulse voltage and adjusts a duty cycle to 75% or more and less than 100% in a mode 3.

The control unit adjusts the duty cycle to 75% or more and less than 100% in a mode 4.

Another embodiment is a viewing angle control film including: a first electrode; a second electrode spaced apart from and facing the first electrode; a light conversion layer disposed between the first electrode and the second electrode; and a control unit configured to adjust a viewing angle of the light conversion layer by adjusting a voltage applied between the first electrode and the second electrode, and the light conversion layer comprises: a plurality of partition walls disposed to be spaced apart between the first electrode and the second electrode; a plurality of containing portions formed between partition walls and disposed with predetermined gaps along the first electrode; and dispersion liquid, light blocking particles and liquid crystals disposed in each of the plurality of containing portions, and the control unit is configured to apply a pulse voltage that swings between a positive signed first voltage and a negative signed second voltage having the same duration as that of the first voltage, and adjusts a magnitude of the first voltage in each drive mode.

The control unit is configured to adjust the magnitude of the first voltage to be the same as that of the second voltage in a mode 1.

The control unit is configured to adjust the magnitude of the first voltage to be higher than a magnitude of the second voltage, and gradually increases the magnitude of the first voltage in a mode 2.

The control unit is configured to intermittently apply the pulse voltage and adjust the magnitude of the first voltage to be at least higher than a magnitude of the second voltage in a mode 3.

The control unit is configured to adjust the magnitude of the first voltage to be higher than a magnitude of the second voltage in a mode 4.

An embodiment of the present disclosure provides a display device including: a display panel provided with pixels and configured to display an image; and a viewing angle control film, and the viewing angle control film is disposed on the display panel and is configured to be able to be operated in a private mode which controls light emitted from the display panel to be emitted only within a predetermined angle range, or in a share mode which controls light emitted from the display panel to be emitted in an angle range wider than the predetermined angle range.

Still another embodiment of the present disclosure provides a viewing angle control film comprising: a first electrode; a second electrode spaced apart from and facing the first electrode; a light conversion layer disposed between the first electrode and the second electrode; and a control unit configured to adjust a viewing angle of the light conversion layer by applying, between the first electrode and the second electrode, a pulse voltage that swings between a positive signed first voltage and a negative signed second voltage, wherein the light conversion layer comprises: a plurality of partition walls disposed to be spaced apart between the first electrode and the second electrode; a plurality of containing portions, each of which is formed between two adjacent partition walls of the plurality of partition walls, and disposed with predetermined gaps along the first electrode; and dispersion liquid, light blocking particles and nematic liquid crystals having polarity disposed in each of the plurality of containing portions.

A viewing angle control film and a display device including the same according to the embodiments of the present disclosure can address a limitation of a driving performance in a private mode deteriorating in a low-temperature environment.

Further, it becomes possible to enable fast switching from a private mode to a share mode.

In addition, it becomes possible to prevent agglomeration of light blocking particles that takes place when being operated for a long time in the share mode. Further, it becomes possible to separate the aggregated light blocking particles from each other.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Shapes, sizes, proportions, angles, numbers and the like disclosed in the accompanying drawings are taken merely as examples to explain embodiments and the present disclosure is not limited thereto. Like reference numerals denote like elements throughout the specification. In addition, in describing the present disclosure, if a description of a related known art in detail is deemed to unnecessarily obscure the substance of the present disclosure, description of such art will be omitted. When terms, 'comprise', 'have' and 'be achieved' and the like, are used in the present disclosure, other object not mentioned therein can be added unless the terms are used with the term 'only'. The singular forms expressed herein are intended to include the plural forms as well, unless the context expressly indicates otherwise.

Components are interpreted to include an error range unless otherwise expressly stated.

In case of describing positions, for example, when describing position relation between two parts with terms such as 'in', 'upon', 'below', 'next' and the like, one or more intervening parts can be disposed between the two parts, unless the terms are used with terms 'immediately' or 'directly'.

Though terms such as 'a first', or 'a second' and the like are used to describe various components, these components are not confined by these terms. These terms are merely used to distinguish one component from the other component, and may not define order or sequence. Therefore, a first component being mentioned in the description below can be a second component in a technical concept of the present disclosure.

Like reference numerals denote like elements throughout the specification.

Hereinafter, various embodiments of the present disclosure will be described in detail with reference to accompanying drawings. The titles of the components used hereinbelow are chosen for convenience of description, and they can differ from what they are actually named. Further, all the components of each viewing angle control film and each display device including the same according to all embodiments of the present disclosure are operatively coupled and configured.

Figure 1:
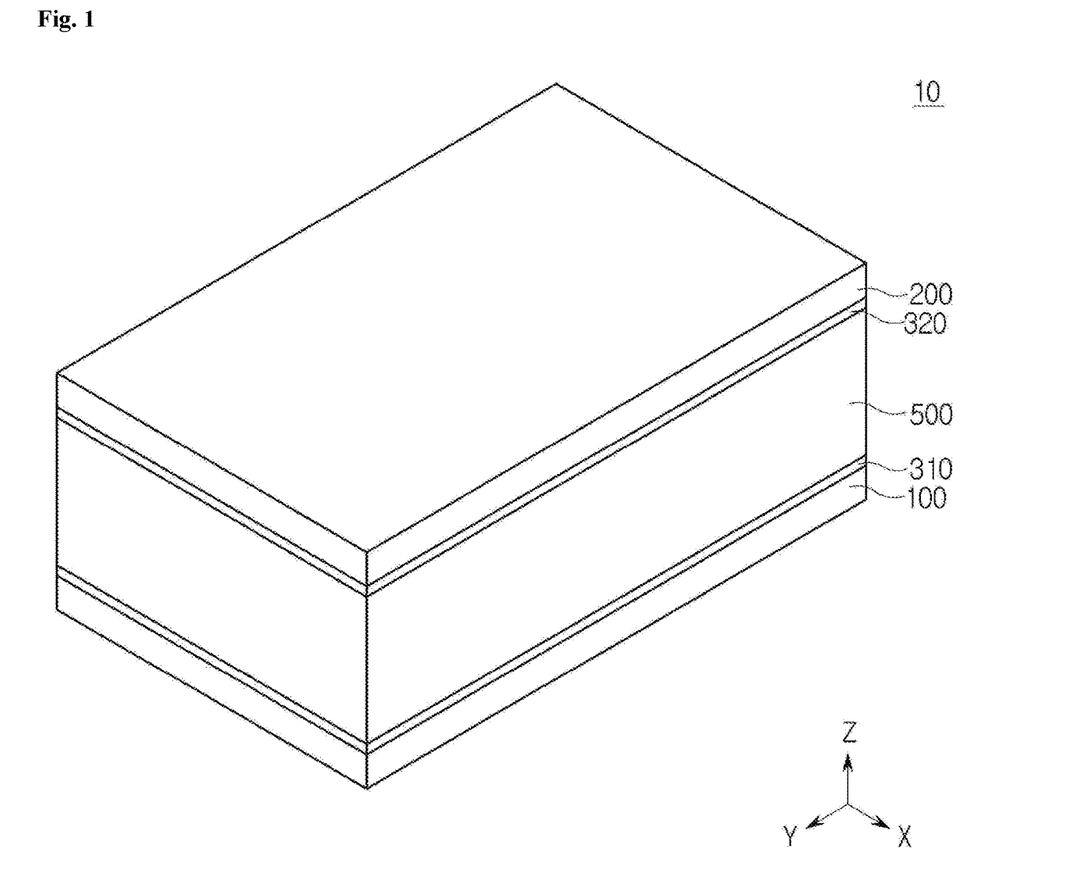
FIG. 1 is a drawing illustrating a perspective view of a viewing angle control film.
Figure 2:
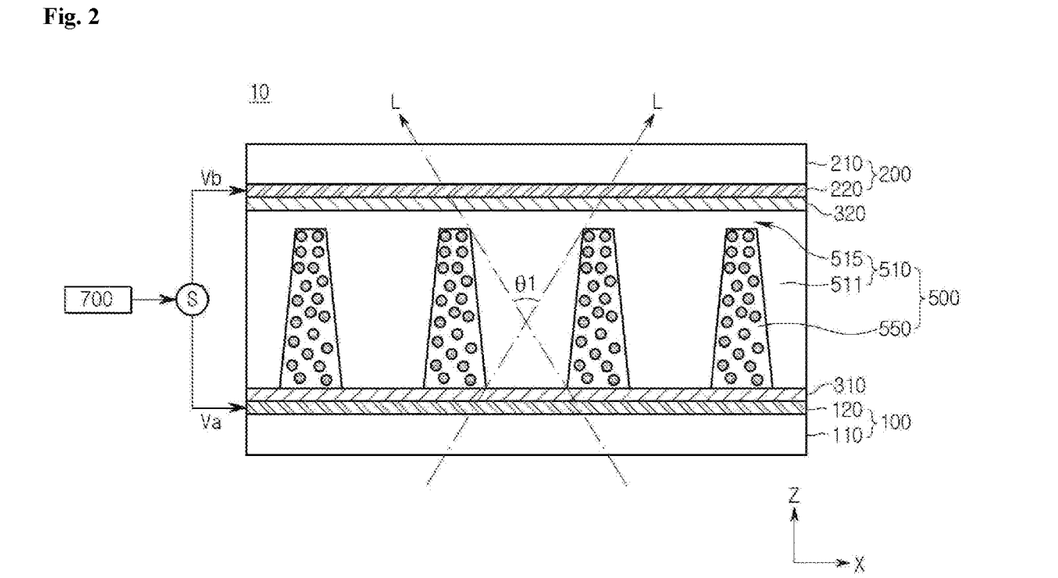
FIG. 2 is a drawing of a portion of FIG. 1 to describe a light traveling path in a private mode.
Figure 3:
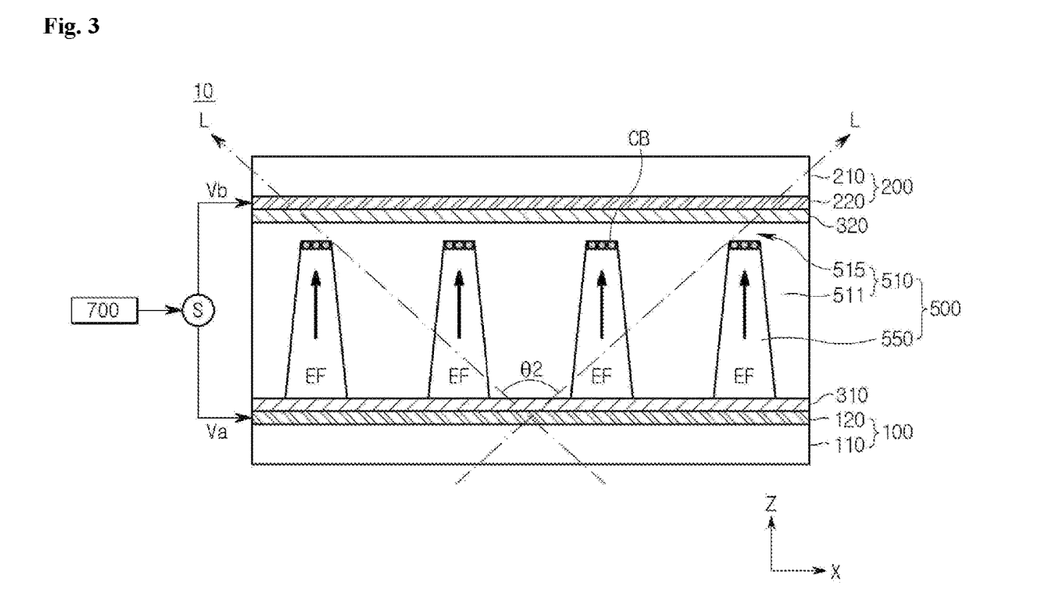
FIG. 3 is a drawing of a portion of FIG. 1 to describe a light traveling path in a share mode.

FIG. 1 is a drawing illustrating a perspective view of a viewing angle control film. FIG. 2 is a drawing of a portion of FIG. 1 to describe a traveling path of light in a private mode. FIG. 3 is a drawing of a portion of FIG. 1 to describe a light traveling path in a share mode.

The viewing angle control film 10 according to the embodiments of FIGS. 1 to 3 includes a first film, a second film, a light conversion layer and an adhesive layer.

The viewing angle control film 10 can constitute a display device which is coupled to a display panel and controls light emitted from a display panel according to a drive mode. In other words, the viewing angle control film 10 can control light emitted from the display panel, by being combined to a part that emits light in the display panel, enabling light emitted from the display panel to be emitted within a predetermined angle range and blocking light that gets out of a predetermined angle range. In addition, the viewing angle control film 10 can make the light emitted from the display panel to be emitted over a predetermined angle range.

Hereinafter, enabling the light emitted from the display panel to be emitted only within a predetermined angle range is referred to as a 'private mode (or a narrow viewing angle mode)' and enabling the light emitted from the display panel to be emitted over a predetermined angle range is referred to as a 'share mode (or wide viewing angle mode)'. In short, the viewing angle control film 10 can be driven to switch to the private mode, or the share mode.

The viewing angle control film 10 includes the first film 100, a first adhesive layer 310 disposed on the first film 100, the light conversion layer 500 disposed on the first adhesive layer 310, a second adhesive layer 320 disposed on the light conversion layer 500 and the second film 200 disposed on the second adhesive layer 320.

The first film 100 can be disposed in the lowest part of the viewing angle control film 10. If the viewing angle control film 10 is combined with a display panel, the first film 100 can be a part which is combined with the display panel. The first film 100 can be combined with the display panel through a transparent adhesive and the like.

The first film 100 includes a first base film 110 and a first electrode 120. The first electrode 120 can be disposed on a top surface of the first base film 110. The first electrode 120 can include a transparent conductive material. For example, the first electrode 120 can include at least one metal among chrome (Cr), nickel (Ni), copper (Cu), aluminum (Al), silver (Ag), molybdenum (Mo), gold (Au), titanium (Ti) and alloys thereof. The first electrode 120 is aimed at forming an electric field in the viewing angle control film 10. The first electrode 120 can be connected to a voltage supply unit (S) and contribute to form an electric field according to a voltage supplied by the voltage supply unit (S).

The second film 200 can be spaced apart from the first film 100 at a certain interval and be disposed to face each other with the first film 100. Between the first film 100 and the second film 200, the first adhesive layer 310, the second adhesive layer 320 and the light conversion layer 500 can be disposed.

The second film 200 can be disposed at an uppermost position of the viewing angle control film 10. If the viewing angle control film 10 is combined with a display panel, the second film 200 can be a part that light emitted from the display panel finally passes through.

The second film 200 can have a shape and a thickness which are the same as those of the first film 100. The second film 200 includes a second base film 210 and a second electrode 220. The second electrode 220 can be disposed below the second base film 210. The second electrode 220 can include a transparent conductive material the same as the first electrode 120. The second electrode 220 can be connected to the voltage supply unit (S) and can form an electric field along with the first electrode 120. If an electric field is formed between the first electrode 120 and the second electrode 220 according to a voltage supplied by the voltage supply unit (S), the share mode can be implemented as in FIG. 3. Further, if the voltage supply unit (S) does not supply a voltage, the electric field between the first electrode 120 and the second electrode 220 may not be formed, and therefore, the private mode can be implemented as in FIG. 2.

The light conversion layer 500 can be disposed between the first film 100 and the second film 200. Specifically, the light conversion layer 500 can be disposed between the first electrode 120 and the second electrode 220. The light conversion layer 500 includes a plurality of containing portions 550 and a louver layer 510 that wraps the plurality of containing portions 550.

The containing portions 550 can be divided into a plurality of regions by the louver layer 510. The containing portion 550 includes dispersion liquid, light blocking particles (CB) and liquid crystals (LC).

The dispersion liquid can be a material that disperses the light blocking particles (CB). The dispersion liquid can include a transparent material. The dispersion liquid can include a nonpolar solvent. The dispersion liquid can include a material that can transmit light. For example, the dispersion liquid can include at least one among Halocarbon oil, paraffinic oil and isopropyl alcohol. The light blocking particles (CB) can be light absorbing particles.

The light blocking particles (CB) can have colors. The light blocking particles (CB) can have a black-based color. For example, the light blocking particles (CB) can include opaque materials such as metal materials, metal oxide materials or nitride materials. More specifically, the light blocking particles (CB) can include one selected among carbon, silicon nitride (SiN), titanium nitride (TiN), silicon carbide (SiC), tantalum (Ta), titanium (Ti), tungsten (W), copper oxide (CuO), aluminum oxide ($Al_2O_3$), iron oxide ($Fe_3O_4$) and tantalum oxide ($Ta_2O_5$). In addition, the light blocking particles (CB) can be made of an organic material having excellent light absorption. Surfaces of the light blocking particles (CB) can be charged. Accordingly, depending on applied electric field, the light blocking particles (CB) can be transferred in one direction. The light blocking particles (CB) can be made of a material formed of an oil containing a plurality of carbon particles, and can block light as the carbon particles absorb light. In such a case, the private mode can be implemented.

Hereinafter, it will be described based on an assumption that the light blocking particles (CB) include carbon particles and surfaces of the light blocking particles (CB) are charged with negative charges. Since the light blocking particles (CB) are negative charges, the electric force (EF) that the light blocking particles (CB) receive becomes opposite to a direction of the electric field.

The liquid crystal (LC) can be configured of a nematic liquid crystal having a polarity. In the share mode, an electric field is formed between the first electrode 120 and the second electrode 220, and a liquid crystal (LC) having a polarity can spin under the influence of the electric field. When switching to the share mode, spinning force that the liquid crystal (LC) generates forms backflow in the dispersion liquid contained in the containing portion 550 and movement of the light blocking particles (CB) can be accelerated under the influence of the backflow. Further, spinning of the liquid crystal (LC) can generate frictional heat due to friction caused between the liquid crystal (LC) and the dispersion liquid, thereby increasing a temperature inside the containing portion 550. In addition, spinning of the liquid crystal (LC) can disturb agglomeration between the light blocking particles (CB) inside the containing portion 550. Detailed description thereof will be provided later on with reference to FIGS. 4 and 5.

The louver layer 510 includes a plurality of partition walls 511 formed to be spaced apart at predetermined intervals. On the light conversion layer 500, the partition walls 511 and the containing portion 550 can be disposed alternately along one direction. The partition walls 511 and the containing portion 550 can have the same or different widths in one direction. In an embodiment, the louver layer 510 can additionally include a base layer 515 connecting the partition walls 511 to each other. The base layer 515 is a characteristic according to an imprinting manufacturing method, and it is not a configuration that must be required for configuring the viewing angle control film 10.

Between the light conversion layer 500 and the first film 100, or between the light conversion layer 500 and the second film 200, the adhesive layer can be disposed. For example, between the light conversion layer 500 and the first electrode 120, the first adhesive layer 310 can be disposed. Further, between the light conversion layer 500 and the second electrode 220, the second adhesive layer 320 can be disposed.

The adhesive layers 310 and 320 can be an optical clear adhesive (OCA) or an optical clear resin (OCR), but is not limited thereto, and can be made of other material capable of adhering the light conversion layer 500 to the first film 100, or the light conversion layer 500 to the second film 200. The adhesive layers 310 and 320 can be made of a transparent material.

The power supply unit (S) is connected to the first electrode 120 and the second electrode 220, and supplies a driving voltage of the viewing angle control film 10. The power supply unit (S) supplies Va voltage to the first electrode 120 and Vb voltage to the second electrode 220. When it comes to the power supply unit (S), the driving voltage V supplied between the first electrode 120 and the second electrode 220 is equal to "V=Vb−Va".

The control unit 700 can adjust a voltage applied to the viewing angle control film 10 so that the viewing angle can be adjusted based on the drive mode of the viewing angle control film 10. The control unit 700 can determine the drive mode of the viewing angle control film 10 among mode 1, mode 2, mode 3 and mode 4. The control unit 700 controls an output voltage of the power supply unit (S) according to the drive mode of the viewing angle control film 10. The control unit 700 can adjust the driving voltage V applied between the first electrode 120 and the second electrode 220 according to the drive mode of the viewing angle control film 10. The control unit 700 can be implemented as an IC (Integrated Circuit) Chip which is embedded in the display apparatus. For example, the control unit 700 can be an electric component implemented by a Timing Controller or a Power Modulation IC. Further, the control unit 700 can be implanted as a separated and independent IC.

In various embodiments, the viewing angle control film 10 can additionally include a temperature sensor. The temperature sensor can measure a temperature inside the containing portion 550 in detail. The temperature information measured by the temperature sensor is delivered to the control unit 700.

In the private mode of FIG. 2, an electric field is not formed between the first electrode 120 and the second electrode 220. Therefore, the light blocking particles (CB) inside the containing portion 550 remain dispersed. Since the light blocking particles (CB) absorb light, the containing portion 550 blocks the light. In the private mode, the viewing angle control film 10 lets most of front light (L) pass through however, inclined light (L1, L2) out of a certain angle range are mostly blocked by the containing portion 550, thereby providing a narrow viewing angle.

In the share mode of FIG. 3, an electric field is formed between the first electrode 120 and the second electrode 220. Therefore, the light blocking particles (CB) inside the containing portion 550 aggregate in Z axis direction at an upper portion or a lower portion. FIG. 3 illustrates agglomeration formed at an upper portion. A position to form agglomeration can be adjusted depending on a direction of the electric field formed between the first electrode 120 and the second electrode 220, or polarity of the light blocking particles (CB). In the share mode, the light blocking particles (CB) that absorb light are aggregated in one side and thus, a wide viewing angle is provided.

In this case, the liquid crystal (LC) spins by the influence of the electric field formed between the first electrode 120 and the second electrode 220, and forms backflow in the dispersion liquid. Movement of the light blocking particles (CB) is accelerated under the influence of the backflow. Thus, the viewing angle control film 10 according to the embodiment can fast switch to the share mode.

Figure 4:
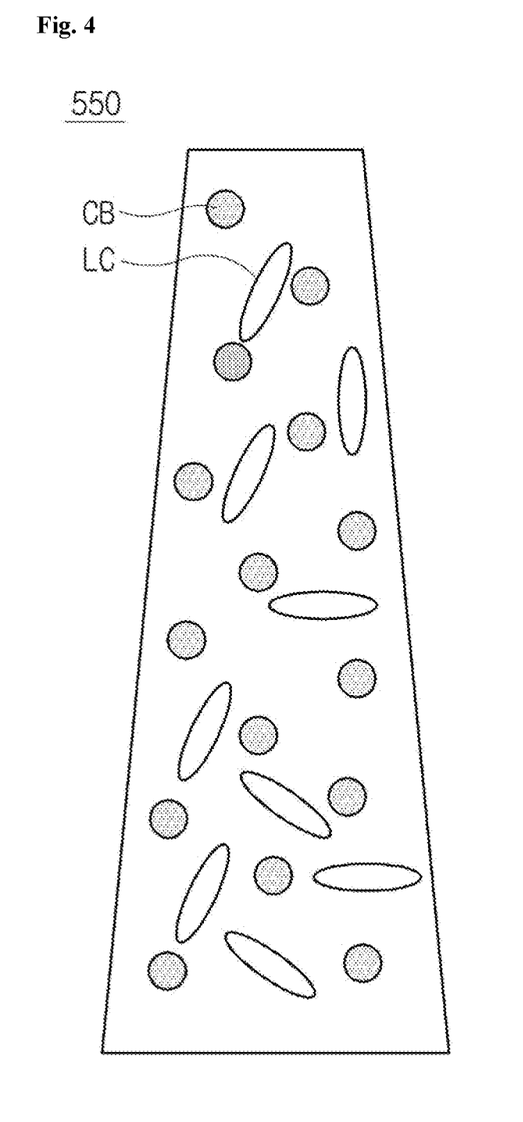
FIG. 4 is a drawing illustrating a containing portion according to an embodiment of the present disclosure.
Figure 5:
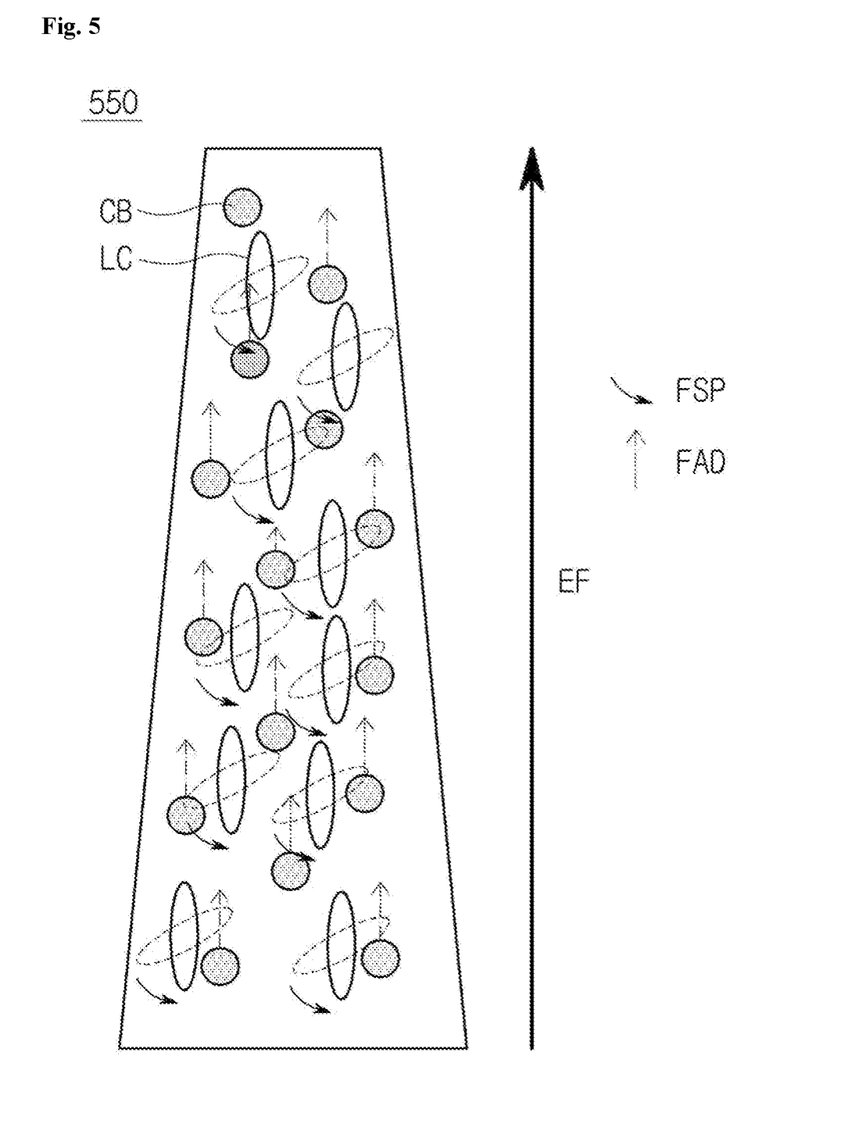
FIG. 5 is a drawing to describe movement of light blocking particles and liquid crystals inside the containing portion when an electric field is applied to the containing portion.

FIG. 4 is a drawing illustrating a containing portion according to an embodiment of the present disclosure. FIG. 5 is a drawing to describe movement of light blocking particles and liquid crystals (LC) inside the containing portion when an electric field is applied to the containing portion.

The liquid crystal (LC) can be configured of a nematic liquid crystal having a polarity. The nematic liquid crystals (LC) are the rod-shaped molecules arranging themselves parallel to each other, and each molecule has a characteristic that its position is not fixed and can move relatively freely in the major axis direction. For this reason, the nematic liquid crystals (LC) have high fluidity and low viscosity compared to other types of liquid crystal (LC).

In the private mode, as in FIG. 4, the light blocking particles (CB) remain dispersed in the containing portion 550. Further, the liquid crystals (LC) also remain dispersed with a random direction inside the containing portion 550.

In the share mode of FIG. 5, the light blocking particles (CB) receives an electric force in an upward direction and moves in an upward direction. The liquid crystals (LC), which were in a dispersed state with a random direction, spin under the influence of an electric force and align in the vertical direction. The spinning force (FSP) generated by the liquid crystals (LC) forms backflow inside the dispersion liquid in the containing portion 550 and the backflow serves as an external force (FAD) being applied to the light blocking particles. Movement of the light blocking particles (CB) can be accelerated in the upward direction by the external force (FAD).

Figure 6:
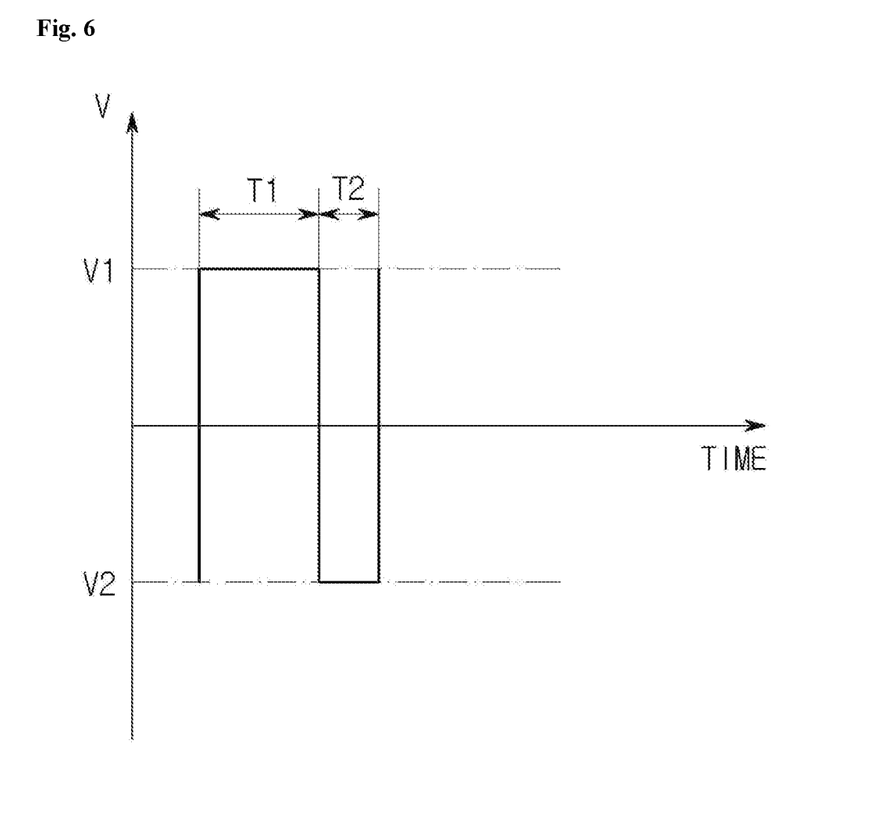
FIG. 6 is a basic diagram of waveforms of a driving voltage applied to a viewing angle control film according to an embodiment of the present disclosure.

FIG. 6 is a basic diagram of waveforms of a driving voltage applied to a viewing angle control film according to an embodiment of the present disclosure.

The driving voltage V applied by the control unit 700 is characterized in being a pulse voltage that swings the first voltage (V1) and the second voltage (V2). The first voltage (V1) has a positive sign and the second voltage (V2) has a negative sign which is opposite to the polarity of the first voltage (V1). The first voltage (V1) is applied in the first interval (T1), and the second voltage (V2) is applied in the second interval (T2). In the present disclosure, the duty cycle is defined as a proportion occupied by an interval of the first voltage (V1). In other words, the duty cycle (%) is calculated as $$\frac{T1}{T1+T2} \times 100.$$

Embodiment 1: Control of Pulse Width Modulation

Figure 7:
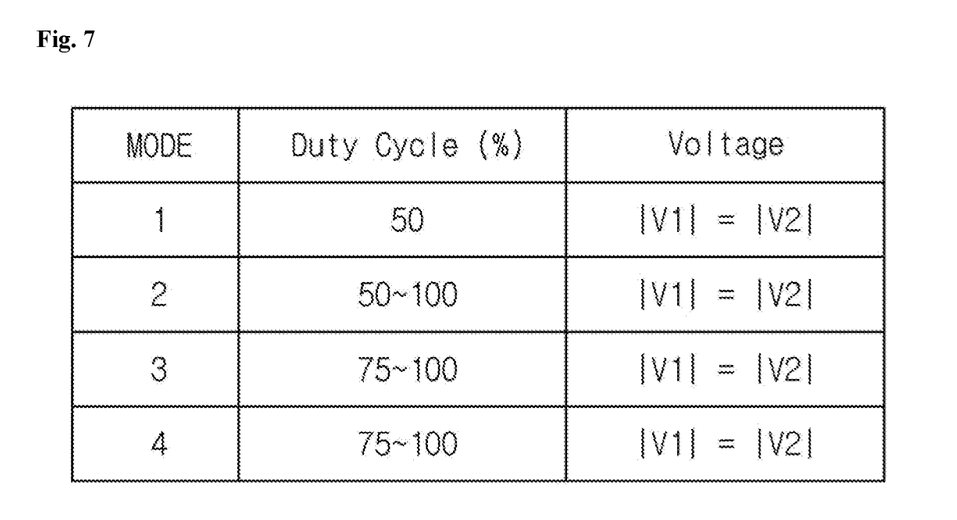
FIGS. 7 and 8 are drawings to describe a method for controlling operation of a viewing angle control film in a pulse width modulation method.
Figure 8:
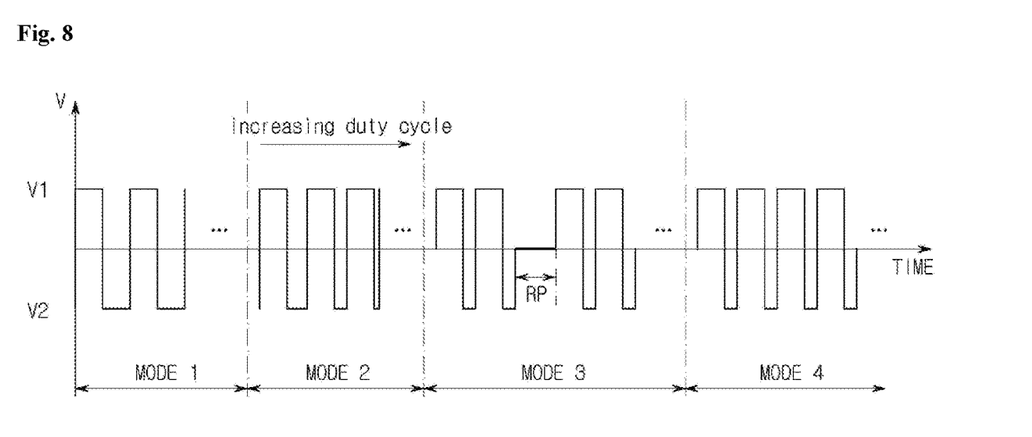

FIGS. 7 and 8 are drawings to describe a method for controlling operation of a viewing angle control film in a pulse width modulation method.

FIG. 7 is a table that sorts out the relation among the duty cycle, the first voltage (V1) and the second voltage (V2) per drive mode. FIG. 8 is an illustration of a waveform of the driving voltage V per drive mode.

The viewing angle control film 10 according to the embodiment can be operated in modes 1, 2, 3 and 4.

The mode 1 (MODE 1) is a mode for driving the viewing angle control film 10 in a low-temperature environment in the private mode.

The mode 2 (MODE 2) is a mode for driving the viewing angle control film 10 by switching fast from the private mode to the share mode.

The mode 3 (MODE 3) is a drive mode for preventing agglomeration of the light blocking particles in the share mode.

The mode 4 (MODE 4) is a drive mode for resolving aggregation of the light blocking particles in the share mode.

In the Embodiment 1, a magnitude of the first voltage (V1) and the second voltage (V2) is the same while polarity is opposite to each other. In the Embodiment 1, the control unit 700 only adjust the duty cycle, the magnitude and polarity of the first voltage (V1) and the second voltage (V2) are not changed.

In the mode 1 (MODE 1), the control unit 700 adjusts the duty cycle to 50%. Since the duty cycle is 50%, an average voltage applied to the viewing angle control film 10 is 0 V. Therefore, an average electric force applied to the light blocking particles (CB) is 0, and the light blocking particles (CB) are disposed in a dispersed state in the containing portion 550 as in FIG. 2. As a result, the viewing angle control film 10 maintains the private mode having a narrow viewing angle.

Meanwhile, the driving voltage V applied in the mode 1 (MODE 1) is a pulse voltage that swings the first voltage (V1) and the second voltage (V2), and the liquid crystals (LC) provided in the containing portion 550 repeatedly spin. As the liquid crystals (LC) provided in the containing portion 550 spin repeatedly, the dispersion liquid and the containing portion 550 generate friction between them, and a frictional heat is generated.

As a result, when being driven in the low-temperature environment in the private mode, the viewing angle control film 10 according to the embodiment applies a pulse voltage having a duty cycle of 50%, the light blocking particles (CB) maintain the dispersed state in the containing portion 550, and liquid crystals (LC) repeatedly spin, thereby increasing a temperature inside the containing portion 550. Therefore, even if the viewing angle control film 10 is exposed to the low-temperature environment, a driving performance and reliability of the viewing angle control film 10 can be improved by driving the mode 1 (MODE 1). The number of spinning of the liquid crystals (LC) is in proportion to a frequency of the pulse applied to the viewing angle control film 10, thus, if increasing the driving frequency of the pulse, the frictional heat being supplied to the containing portion 550 can increase.

In the mode 2 (MODE 2), the control unit 700 gradually adjusts the duty cycle from 50% to a value less than 100%. Since the duty cycle is adjusted to increase from 50% gradually, an average voltage applied to the viewing angle control film 10 is a positive voltage. Thus, an average electric force being applied to the light blocking particles (CB) exceeds 0, and the light blocking particles (CB) aggregate at an upper portion in the containing portion 550 as in FIG. 3. As a result, the viewing angle control film 10 becomes to be in the share mode having a wide viewing angle.

In the meantime, in the mode 2 (MODE 2), a pulse voltage that swings the first voltage (V1) and the second voltage (V2) is applied, the liquid crystals (LC) provided in the containing portion 550 spin. As described with reference to FIG. 5, the spinning force (FSP) generated by the liquid crystals (LC) forms backflow inside the dispersion liquid in the containing portion 550 and the backflow serves as an external force (FAD) to the light blocking particles (CB). Since the duty cycle is adjusted to gradually increase from 50%, the external force (FAD) given to the light blocking particles (CB) increases little by little, and the movement of the light blocking particles (CB) towards the upper portion can accelerate by the external force (FAD). Therefore, the viewing angle control film 10 according to the embodiment can fast switch from the private mode to the share mode.

In the mode 3 (MODE 3), while the control unit 700 applies the pulse voltage intermittently, the control unit 700 adjusts the duty cycle to 75% or more and less than 100%. In the mode 3 (MODE 3), the pulse voltage that swings the first voltage (V1) and the second voltage (V2) has a rest phase (RP), and is applied intermittently.

In the mode 3 (MODE 3), since the duty cycle is 75% or more, the light blocking particles (CB) aggregate at an upper portion in the containing portion 550. As a result, the viewing angle control film 10 becomes to be in the share mode having a wide viewing angle as in FIG. 3. Meanwhile, if the share mode is driven for a long time, the light blocking particles (CB) aggregate with each other, and agglomeration of the light blocking particles (CB) can occur. If the agglomeration of the light blocking particles (CB) occurs, since responsiveness to the electric force drops, luminance reduction or a black spot defect from the side view point occurs in the share mode and a stain defect occurs after switching to the private mode.

In the mode 3 (MODE 3), the pulse voltage that swings the first voltage (V1) and the second voltage (V2) has a rest phase (RP), and is applied intermittently, the liquid crystals (LC) provided in the containing portion 550 spin intermittently. Therefore, even if the share mode is driven in the viewing angle control film 10 according to the embodiment for a long time, it becomes possible to prevent agglomeration of the light blocking particles (CB) thanks to the liquid crystals (LC) that spin intermittently.

In the mode 4 (MODE 4), the control unit 700 adjusts the duty cycle to be 75% or more and less than 100%. As in the mode 3 (MODE 3), the duty cycle is 75% or more, the light blocking particles (CB) aggregate at an upper portion of the containing portion 550 as in FIG. 3. As a result, the viewing angle control film 10 becomes to be in the share mode having a wide viewing angle.

The mode 4 (MODE 4) has a difference in that it has no rest phase (RP) compared to the mode 3 (MODE 3). The mode 3 (MODE 3) has an advantage of lower power consumption compared with the mode 4 (MODE 4). To the contrary, a pulse voltage is continuously applied in the mode 4 (MODE 4) without the rest phase (RP), the number of spinning of the liquid crystal (LC) is higher than that of the mode 3 (MODE 3). Therefore, the mode 4 (MODE 4) has advantages that the agglomeration of the light blocking particles (CB) can be prevented and if the light blocking particles (CB) are aggregated, it is possible to separate the light blocking particles (CB) from the agglomeration thanks to a higher spinning force of the liquid crystals (LC).

Embodiment 2: Control of Amplitude Size Modulation

Figure 9:
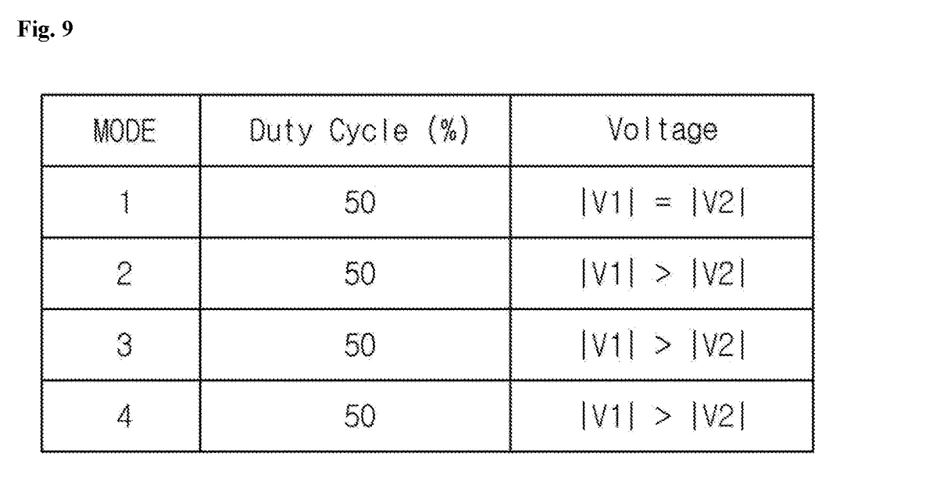
FIGS. 9 and 10 are drawings to describe a method for controlling a viewing angle control film in an amplitude size modulation method.
Figure 10:
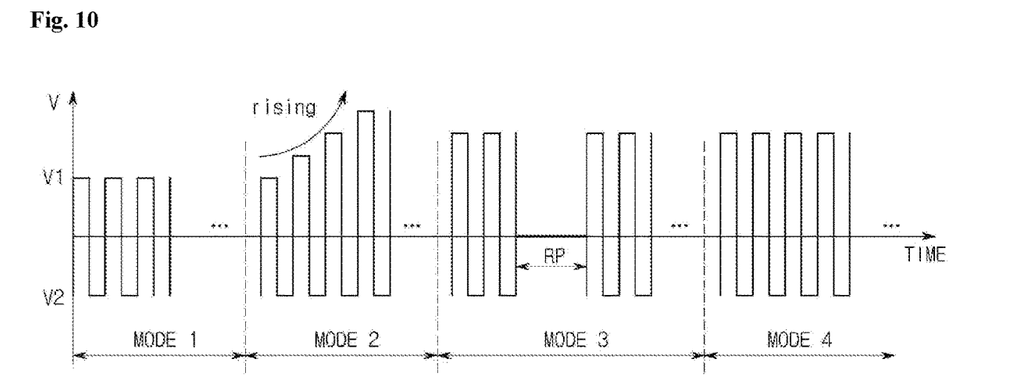

FIGS. 9 and 10 are drawings to describe a method for controlling operation of the viewing angle control film in an amplitude size modulation method.

FIG. 9 is a table that sorts out the relation among the duty cycle, the first voltage (V1) and the second voltage (V2) per drive mode. FIG. 10 is an illustration of the drive waveforms per drive mode.

Meaning of the modes 1 to 4 (MODES 1 to 4) in the Embodiment 2 is the same as that of the Embodiment 1, but compared with the Embodiment 1, there is one difference which is how to control them.

In the Embodiment 2, the pulse width of the first voltage (V1) and the second voltage (V2) are the same. For example, the duty cycle is 50%. The polarity of the first voltage (V1) and the second voltage (V2) is opposite to each other, and their magnitude can differ from each other. In the Embodiment 2, the control unit 700 adjusts a magnitude of the first voltage (V1) only, and does not change a magnitude and a duty cycle of the second voltage (V2).

In the mode 1 (MODE 1), the control unit 700 adjusts a magnitude of the first voltage (V1) to be the same as a magnitude of the second voltage (V2).

In the same principle as the mode 1 (MODE 1) of the Embodiment 1, the light blocking particles (CB) are disposed in a dispersed state in the containing portion 550 and the viewing angle control film 10 maintains the private mode having a narrow viewing angle. Further, spinning of the liquid crystal (LC) can generate frictional heat due to friction caused between the liquid crystals (LC) and the dispersion liquid. Therefore, even if the viewing angle control film 10 is exposed to a low-temperature environment, a driving performance and reliability of the viewing angle control film 10 can be improved by driving the mode 1 (MODE 1).

In the mode 2 (MODE 2), the control unit 700 adjusts a magnitude of the first voltage (V1) to be higher than that of the second voltage (V2), and gradually adjusts a magnitude of the first voltage (V1) to be higher. As the same as the Embodiment 1, an average electric force applied to the light blocking particles (CB) exceeds 0 and the light blocking particles (CB) aggregate at an upper portion in the containing portion 550 as in FIG. 3. As a result, the viewing angle control film 10 becomes to be in the share mode having a wide viewing angle. Since a magnitude of the first voltage (V1) is adjusted to be gradually higher as described in FIG. 5, the spinning force (FSP) generated by the liquid crystals (LC) forms backflow inside the dispersion liquid in the containing portion 550, the backflow serves as an external force (FAD) to the light blocking particles (CB), and the movement of the light blocking particles (CB) can accelerate by the external force (FAD). Therefore, the viewing angle control film 10 according to the embodiment can be switched fast from the private mode to the private mode.

In the mode 3 (MODE 3), while the control unit 700 applies the pulse voltage intermittently, the control unit 700 adjusts a magnitude of the first voltage (V1) to be at least higher than a magnitude of the second voltage (V2). In the mode 3 (MODE 3), the pulse voltage that swings the first voltage (V1) and the second voltage (V2) has a rest phase (RP) and is intermittently applied.

In the mode 3 (MODE 3), since the first voltage (V1) is adjusted to be a higher value than the second voltage (V2), the light blocking particles (CB) are aggregated at an upper portion in the containing portion 550 as in FIG. 3. As a result, the viewing angle control film 10 becomes to switch to the share mode having a wide viewing angle.

In the meantime, in the mode 3 (MODE 3), as the pulse voltage that swings the first voltage (V1) and the second voltage (V2) has a rest phase (RP) and is intermittently applied, the liquid crystals (LC) provided in the containing portion 550 intermittently spin. Therefore, the viewing angle control film 10 according to the embodiment can prevent agglomeration of the light blocking particles (CB) despite operation for a long time in the share mode, thanks to the liquid crystals (LC) that intermittently spin.

In the mode 4 (MODE 4), the control unit 700 adjusts a magnitude of the first voltage (V1) to be at least higher than a magnitude of the second voltage (V2). As explained in the Embodiment 1, compared with the mode 3 (MODE 3), the mode 4 (MODE 4) has difference in that the mode 4 (MODE 4) has no rest phase (RP).

As explained above, the mode 3 (MODE 3) has advantage in that the mode 3 (MODE 3) consumes less power compared with the mode 4 (MODE 4). In the mode 4 (MODE 4), it is possible not only to prevent agglomeration of the light blocking particles (CB), but also to separate the light blocking particles (CB) having agglomeration thanks to high spinning force of the liquid crystals (LC) if the light blocking particles (CB) are aggregated.

Figure 11:
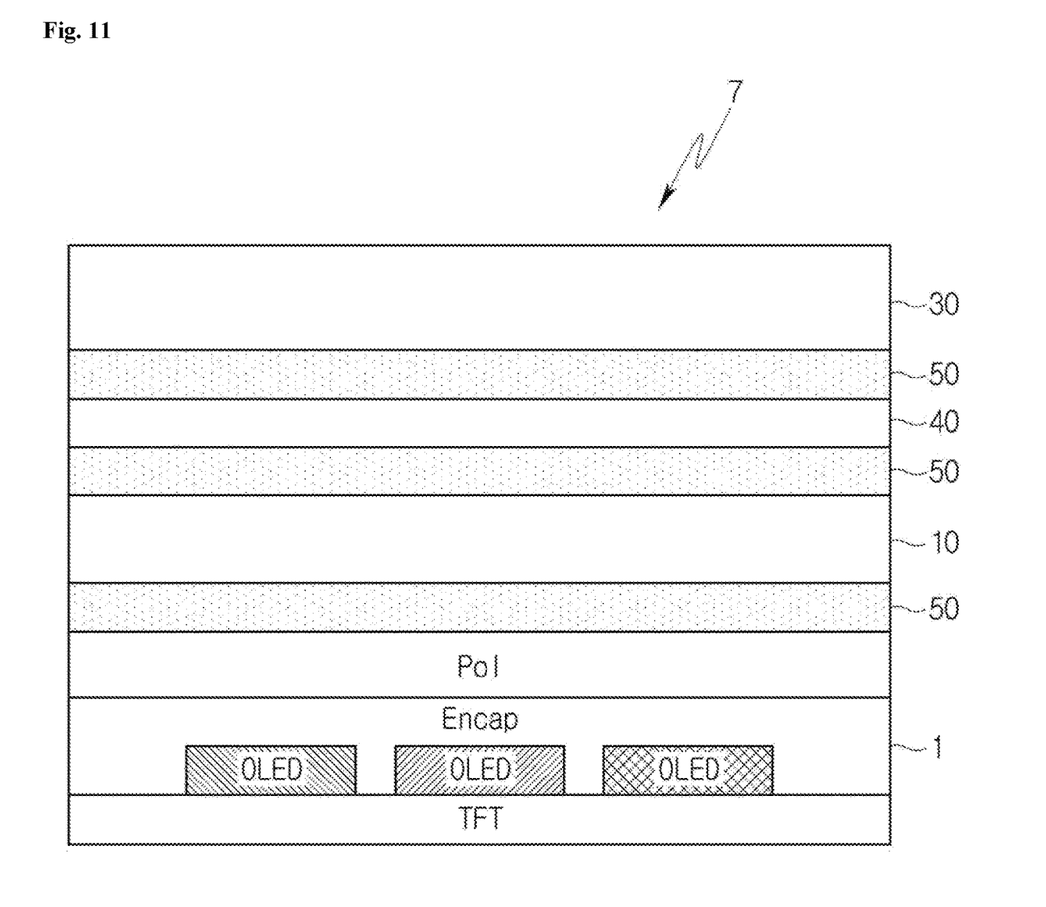
FIG. 11 is a sectional view of a display device according to an embodiment of the present disclosure.

FIG. 11 is a sectional view of a display device according to an embodiment of the present disclosure.

With reference to FIG. 11, a display device 7 can include the viewing angle control film 10 and the cover substrate 30.

A display panel 1 can include a plurality of pixels disposed in the display area of a base substrate, and drivers for driving the pixels disposed in a non-display area around the display area. The pixels can include transistors (TFT) connected via a control signal line to drivers and organic light emitting diodes (OLED) connected to the transistors. The transistors adjust an amount of a current applied to the organic light emitting diodes as the transistors are turned on or off according to a control signal being applied via a control signal line. The organic light emitting diodes can emit light at a luminance corresponding to an amount of a current being applied via the transistor. The display panel 1 can further include an encapsulating layer (Encap) that encapsulates the organic light emitting diodes (OLED) and a protection layer (Pol) that protects an upper part.

The viewing angle control film 10 can be disposed on the display panel 1. The viewing angle control film 10 can control light traveling path generated in the display panel 1 according to an operation mode of the display device 7. For example, if the display device 7 operates in the private mode which is a mode 1, the light conversion layer 500 of the viewing angle control film 10 is controlled in a light blocking mode in which a view is opened at a front of the display device 7, and a view is blocked on a side thereof. In the private mode, the viewing angle control film 10 is disposed on the display panel and can control light emitted from the display panel to be emitted within a predetermined angle range only. If the display panel 7 operates in the share mode which is the mode 2, the light conversion layer 500 of the viewing angle control film 10 is controlled in a light-cast mode in which a view at a front and at a side of the display panel 7 is opened. In the share mode, the viewing angle control film 10 can control light emitted from the display panel to be emitted over a predetermined angle range.

The cover substrate 30 can be disposed on the viewing angle control film 10. The cover substrate 30 can be provided to protect the display device 7 from external shocks or foreign materials. The cover substrate 30 can be a light-transmissive substrate, and a rigid substrate including glass or tempered glass, or a flexible substrate made of plastic.

In the embodiment, the display device 7 can further include a touch panel 40. The touch panel 40 can be configured in a capacitive type or a resistive film type and the like and can detect a touch input by a user.

The display panel 1, the viewing angle control film 10, the touch panel 40 and the cover substrate 30 can be adhered to each other through an adhesive layer 50. The adhesive layer 50 can be an optical clear adhesive (OCA) or an optical clear resin (OCR).

Described above are embodiments of the present disclosure by referring to the accompanying drawings. It would be understood that the technical configurations of the present disclosure described herein can be implemented in other concrete forms by those skilled in the art without departing from the technical concept or essential features thereof. Thus, it should be understood that embodiments described hereinabove are examples in all aspects, and do not limit the present disclosure. Moreover, the scope of the present invention will be denoted by the claims provided herein, rather than the detailed description. In addition, it should be construed that all modifications or variations that are derived from the meaning, scope and the concept of equivalence of the claims are covered in the scope of the present disclosure.

What is claimed is:

1. A viewing angle control film comprising:
a first electrode;
a second electrode spaced apart from and facing the first electrode;
a light conversion layer disposed between the first electrode and the second electrode; and
a control unit configured to adjust a viewing angle of the light conversion layer by adjusting a voltage applied between the first electrode and the second electrode,
wherein the light conversion layer comprises:
a plurality of partition walls disposed to be spaced apart between the first electrode and the second electrode;
a plurality of containing portions disposed between partition walls and disposed with predetermined gaps along the first electrode; and
dispersion liquid, light blocking particles and liquid crystals disposed in each of the plurality of containing portions,
wherein the control unit is configured to apply a pulse voltage that swings between a positive signed first voltage and a second voltage having a same magnitude as a magnitude of the first voltage and a polarity opposite to a polarity of the first voltage, and adjust a duty cycle, which is a proportion occupied by an interval of the first voltage, in each drive mode, and
wherein a private mode having a narrow viewing angle and a share mode having a wide viewing angle are included, and the control unit applies the pulse voltage in the share mode.

2. The viewing angle control film of claim 1, wherein the control unit is configured to adjust the duty cycle to 50% in a mode 1.

3. The viewing angle control film of claim 1, wherein the control unit is configured to gradually increase the duty cycle from 50% to a value less than 100% in a mode 2.

4. The viewing angle control film of claim 1, wherein the control unit is configured to intermittently apply the pulse voltage and adjust the duty cycle to 75% or more and less than 100% in a mode 3.

5. The viewing angle control film of claim 1, wherein the control unit is configured to adjust the duty cycle to 75% or more and less than 100% in a mode 4.

6. A display device comprising:
a display panel provided with pixels and configured to display an image; and
the viewing angle control film of claim 1,
wherein the viewing angle control film is disposed on the display panel and is configured to be able to be operated in the private mode which controls light emitted from the display panel to be emitted only within a predetermined angle range, or in the share mode which controls light emitted from the display panel to be emitted in an angle range wider than the predetermined angle range.

7. The viewing angle control film of claim 1, wherein a duty cycle of the private mode is smaller than a duty cycle of the share mode.

8. A viewing angle control film comprising:
a first electrode;
a second electrode spaced apart from and facing the first electrode;
a light conversion layer disposed between the first electrode and the second electrode; and
a control unit configured to adjust a viewing angle of the light conversion layer by adjusting a voltage applied between the first electrode and the second electrode,
wherein the light conversion layer comprises:
a plurality of partition walls disposed to be spaced apart between the first electrode and the second electrode;
a plurality of containing portions disposed between partition walls and disposed with predetermined gaps along the first electrode; and
dispersion liquid, light blocking particles and liquid crystals disposed in each of the plurality of containing portions,
wherein the control unit is configured to apply a pulse voltage that swings between a positive signed first voltage and a negative signed second voltage having a same duration as that of the first voltage, and adjust a magnitude of the first voltage in each drive mode, and
wherein a private mode having a narrow viewing angle and a share mode having a wide viewing angle are included, and the control unit applies the pulse voltage in the share mode.

9. The viewing angle control film of claim 8, wherein the control unit is configured to adjust the magnitude of the first voltage to be the same as that of the second voltage in a mode 1.

10. The viewing angle control film of claim 8, wherein the control unit is configured to adjust the magnitude of the first voltage to be higher than a magnitude of the second voltage, and gradually increase the magnitude of the first voltage in a mode 2.

11. The viewing angle control film of claim 8, wherein the control unit is configured to intermittently apply the pulse voltage and adjust the magnitude of the first voltage to be at least higher than a magnitude of the second voltage in a mode 3.

12. The viewing angle control film of claim 8, wherein the control unit is configured to adjust the magnitude of the first voltage to be higher than a magnitude of the second voltage in a mode 4.

13. The viewing angle control film of claim 8, wherein the first voltage is greater than the second voltage in the share mode.

14. A viewing angle control film comprising:
  a first electrode;
  a second electrode spaced apart from and facing the first electrode;
  a light conversion layer disposed between the first electrode and the second electrode; and
  a control unit configured to adjust a viewing angle of the light conversion layer by applying, between the first electrode and the second electrode, a pulse voltage that swings between a positive signed first voltage and a negative signed second voltage,
  wherein the light conversion layer comprises:
    a plurality of partition walls disposed to be spaced apart between the first electrode and the second electrode;
    a plurality of containing portions disposed between partition walls and disposed with predetermined gaps along the first electrode; and
    dispersion liquid, light blocking particles and nematic liquid crystals having polarity disposed in each of the plurality of containing portions, and
  wherein a private mode having a narrow viewing angle and a share mode having a wide viewing angle are included, and the control unit applies the pulse voltage in the share mode.

* * * * *